UNITED STATES PATENT OFFICE.

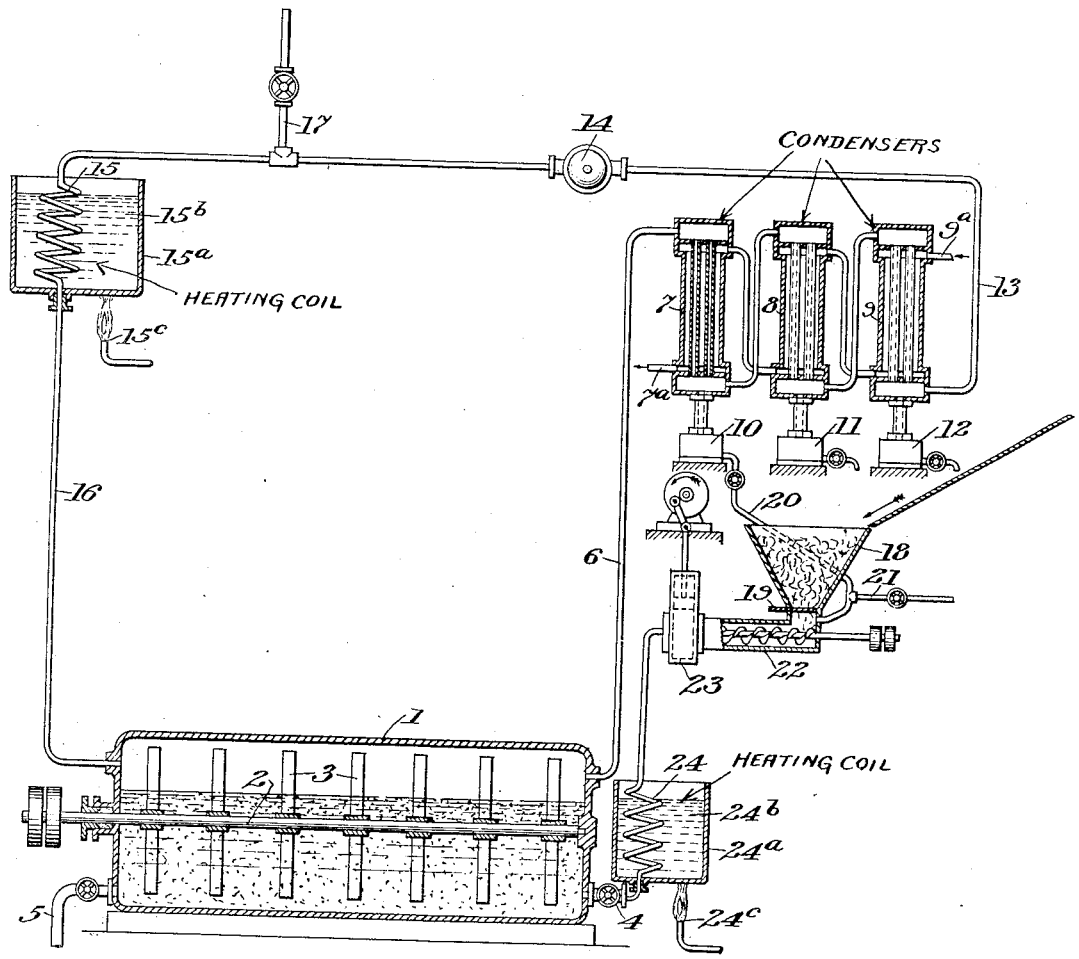

FRIEDRICH BERGIUS, OF ESSEN-ON-THE-RUHR, GERMANY, ASSIGNOR, BY MESNE ASSIGNMENTS, TO THE CHEMICAL FOUNDATION, INC., A CORPORATION OF DELAWARE.

PROCESS OF HYDROGENATING CARBON COMPOUNDS.

1,342,790.   Specification of Letters Patent.   Patented June 8, 1920.

Application filed April 18, 1916. Serial No. 92,064.

*To all whom it may concern:*

Be it known that I, Dr. FRIEDRICH BERGIUS, a citizen of the Empire of Germany, residing at Essen-on-the-Ruhr, Germany, have invented certain new and useful Improvements in Processes of Hydrogenating Carbon Compounds of which the following is a specification.

This invention relates to the hydrogenation of carbon compounds such as natural combustibles by subjecting them to the action of a hydrogen-containing atmosphere at a temperature of preferably about 400° C. and not less than 250° C. and not more than 500° C. and at a hydrogen pressure of preferably about 100 atmospheres and not less than 20 atmospheres. The object of the invention is to improve this hydrogenating process especially if applied to carbon compounds which are not liquid under reaction conditions, and to raise the yield in hydrogenated products. The invention consists in a special manner of carrying through the hydrogenation process, in that the raw materials to be hydrogenated are subjected to hydrogenation in mixture with materials which do not disturb the hydrogenation process and which are liquid under the reaction temperatures and which react with the hydrogen either with heat development which is less than the reaction heat of hydrogen on the raw material in question or which do not react at all with the hydrogen under the existing conditions. The effect of the presence of substances of the said kind in the reaction process is that excessive local heat production which may take place in the reaction process, especially if the reaction is exerted on solid raw materials, is avoided. This depends on the special quality of the additional liquid present in the reaction process to distribute developed heat of reaction, without itself giving rise to considerable development of heat.

Materials which may be used in connection with raw materials to be hydrogenated in accordance with this invention are especially hydrocarbon oils of high boiling point, such as rock oil and tar oil. Besides such oils other materials which do not disturb the hydrogenation process and preferably assist it may be used such as naphthalene, anthracene, etc., and pitch, etc., which are solid at ordinary temperature but liquid under the reaction conditions in question.

Especially valuable as liquid additions to the raw material to be reacted on are such hydrogenated carbon compounds as are formed in carrying through the hydrogenation of carbon compounds under high pressure and elevated temperature. These substances readily enter into the reaction process. Therefore, the process may be carried through for instance with pulverized coal in that the pulverized coal is intermixed with mineral oil of high boiling point, say above 200° C., and introduced as a thick paste into the reaction vessel and such paste subjected therein to high pressure of say 100 atmospheres of hydrogen and elevated temperature of say 400° C. Under the influence of these reaction conditions the material under treatment begins to undergo hydrogenation. The hydrogenated product enters in the form of vapor into the gaseous space above the mass contained in the reaction vessel and may be drawn off and subjected to fractional distillation. In this way a fraction of hydrogenated products may be obtained which has a very high boiling point of say between 300 and 400° C. so that the main part of it remains in liquid condition if again introduced into the reaction vessel. Such high boiling fraction of the reaction product may now be used as addition to the pulverized coal to be treated instead of the mineral oil which had been used in the beginning of the process. In this way the process may be continued with the products obtained thereby as liquid additions to the pulverized coal so that no material is needed besides the coal itself after the process once has been duly started.

It appears from this that it is important for an effective carrying through of the process that the raw material entering the reaction should be properly intermixed with the products of hydrogenation which represent higher stages of hydrogenation than the original raw material and which are distinguished from the original raw material also in that on being further hydrogenated they develop less heat than the original solid material does.

The addition of oils and other substances which are liquid under the conditions of the reaction and the reaction heat of which with hydrogen is less than that of the raw material to be treated may be used not only for raw materials such as coal, peat and wood which are not meltable at the reaction temperature but also for meltable carbon compounds such as pitch and even for certain liquid oil residues the reaction heat which with hydrogen is very high. Also such materials although liquid may give rise to local overheating which is prevented by intermixing of the material with oils or other liquid substances of low reaction heat.

In order that my invention may be clearly understood by those skilled in the art I have diagrammatically represented in the annexed drawing a device wherein the process may be carried through.

On the drawing the numeral 1 designates a reaction vessel adapted to resist high pressure. 2 is a rotatable shaft within the reaction vessel and 3 are stirring members adapted to stir up the reaction material contained within the vessel. 4 is a feeding pipe for introducing the raw material to be reacted on; 5 is an exit tube for removing material from the receptacle 1. 6 is a tube section leading from the gaseous space of the reaction vessel to the condensing system 7, 8, 9. The cooling medium enters into the condensing system through conduit $9^a$ and leaves it through conduit $7^a$. 10, 11, and 12 are collecting vessels connected to the said elements of the condensing system respectively. 13 is a further section of a circulating conduit including the reaction vessel 1. 14 is a circulating pump, 15 is a heating coil arranged within a receptacle $15^a$ containing a heating medium such as a lead bath $15^b$ adapted to be heated by burner $15^c$. 16 is the return section of the circulating conduit leading back to the reaction vessel 1. 17 is a feeding device for reaction gas, 18 is a hopper for pulverized solid raw material, 19 is a controlling slide and 20 is a feeding tube leading from collecting vessel 10 to the exit end of hopper 18. 21 is a further branch of feeding tube which may be connected to any source of material to be fed to the apparatus. 22 is a mixing screw and 23 a feeding pump adapted to transport the material mixed by the screw 22 into the reaction vessel 1. 24 is a heating coil connecting the exit branch of the pump 23 with the feeding pipe 4.

The heating of the coil and its contents is effected by a heating medium such as a lead bath $24^b$ contained within receptacle $24^a$ and supplied with heat by burner $24^c$ The operation of the device is as follows:

In starting the device the reaction vessel 1 is preferably supplied only with an oil such as a rock oil fraction of about 300° C. boiling point. This oil is introduced through feed pipe branch 21 and pressed into vessel 1 by pump 23 through heating coil 24 where it is preferably heated to a reaction temperature of say 400° C. Hydrogen is introduced through pipe 17 and heated within heating coil 15 likewise preferably to a temperature of say 400° C. The gas is circulated through circulating pump 14 and the liquid contents of the reaction vessel 1 stirred by stirring device 2, 3. Under the working conditions vapors enter the gaseous space above the liquid within the reaction vessel and are drawn off together with the hydrogen which is circulated through pump 14. The condensable vapors are liquefied within the condensers 7, 8, 9 and the condensed liquid is collected within the high pressure vessels 10, 11 and 12. As soon as sufficient liquid of high boiling fraction of say 300° C. boiling-point has been collected within vessel 10 pulverized coal is fed to mixing screw 22 by opening slide 19 and liquid from vessel 10 is fed through tube 20 to the exit end of hopper 18 and intermixed with the pulverized coal by mixing screw 22 so as to form a paste. Such paste is introduced into the reaction vessel 1 as above described in connection with the oil fed through branch pipe 21. Branch pipe 21 may then be closed. The products of reaction continue to collect within the vessels 10, 11, 12 and may be drawn off from time to time as required. From time to time also residues may be drawn off through pipe 5 from the reaction vessel 1. Fresh hydrogen is continuously or intermittently supplied through pipe 17 as above mentioned.

The residues drawn off through pipe 5 consist substantially of the mineral contents of the coal subjected to treatment and of liquid and soluble reaction products. The coal substance itself is nearly completely or at least to 85 per cent. converted into liquid or soluble reaction products provided that a suitable coal has been used and that the process has been carried on for sufficient time. Suitable coals are especially all so-called soft coals.

Of course, instead of using liquid from vessel 10 as addition to the pulverized coal other suitable additional liquid may be used and supplied through feed branch 21. Also liquid from vessel 10 and fed through pipe 21 may be used simultaneously. Instead of coal powder other raw material may be fed through hopper 18 and may be intermixed with additional liquid from vessel 10 or fed through pipe 21.

What I claim is:—

1. A process for hydrogenating carbon compounds consisting therein that the carbon compounds are subjected to the action of a hydrogen containing atmosphere with exclusion of a catalyzer at a temperature of more than 250° C. and less than 500° C. and at a hydrogen pressure of more than 20 atmospheres with admixture to the raw material of a substance which is liquid under reaction conditions and which under the influence of the hydrogen atmosphere develops less heat than the raw material of reaction.

2. A process for hydrogenating carbon compounds consisting therein that the carbon compounds are subjected under stirring to the action of a hydrogen containing atmosphere with exclusion of a catalyzer at a temperature of more than 250° C. and less than 500° C. and at a hydrogen pressure of more than 20 atmospheres with admixture to the raw material of a substance which is liquid under reaction conditions and which under the influence of the hydrogen atmosphere develops less heat than the raw material of reaction.

3. A process for hydrogenating carbon compounds which are solid under ordinary conditions consisting in mixing the carbon compounds in divided condition with an auxiliary material which is liquid under ordinary conditions, introducing the pasty or semi-liquid mixture into a high pressure reaction vessel, and subjecting it to the action of a hydrogen-containing atmosphere at a temperature of more than 250° C. and less than 500° C. and at a hydrogen pressure of more than 20 atmospheres.

4. A process for hydrogenating carbon compounds which are solid under ordinary conditions consisting in mixing the carbon compounds in divided condition with an auxiliary material which is liquid under ordinary conditions, introducing the pasty or semi-liquid mixture into a high pressure reaction vessel and subjecting it to the action of a hydrogen-containing atmosphere at a temperature of more than 250° C. and less than 500° C. and at a hydrogen pressure of more than 20 atmospheres, the liquid auxiliary material being of such quality that under reaction conditions it develops less heat than the solid raw material itself.

5. A process for hydrogenating carbon compounds under high pressure and elevated temperature consisting in preparing a mixture of finely divided reactive coal with an auxiliary material which is liquid under reaction conditions and which under the influence of the hydrogen reaction atmosphere develops less heat than the raw material itself, introducing said mixture into a high pressure reaction vessel and bringing it into reaction with hydrogen under high pressure and elevated temperature and collecting the products of reaction.

6. A process for hydrogenating carbon compounds which are not liquid under ordinary conditions consisting therein that the carbon compounds to be treated are subjected to the action of a hydrogen-containing atmosphere at a temperature of more than 250° C. and less than 500° C. and at a hydrogen pressure of more than 20 atmospheres with admixture to the raw material of a hydrocarbon having a boiling-point of more than 200° C. and which is liquid under reaction conditions.

7. A process for hydrogenating carbon compounds which are not liquid under ordinary conditions consisting therein that the carbon compounds to be treated are subjected to the action of a hydrogen-containing atmosphere at a temperature of more than 250° C. and less than 500° C. and at a hydrogen pressure of more than 20 atmospheres with admixture to the raw material of a hydrocarbon of high boiling-point obtained by reaction of hydrogen under high pressure and elevated temperature on carbon compounds which are not liquid under ordinary conditions.

In testimony whereof I affix my signature in presence of two witnesses.

Dr. FRIEDRICH BERGIUS.

Witnesses:
 HENRY HASPER,
 ARTHUR SCHROEDER.